(No Model.)
L. LEHMAN.
WAGON END GATE.
No. 318,635. Patented May 26, 1885.
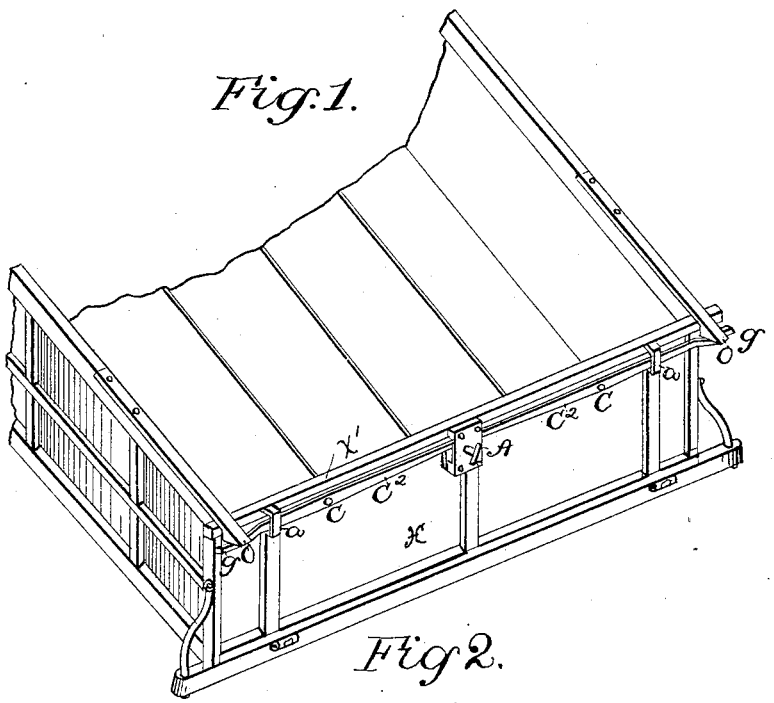
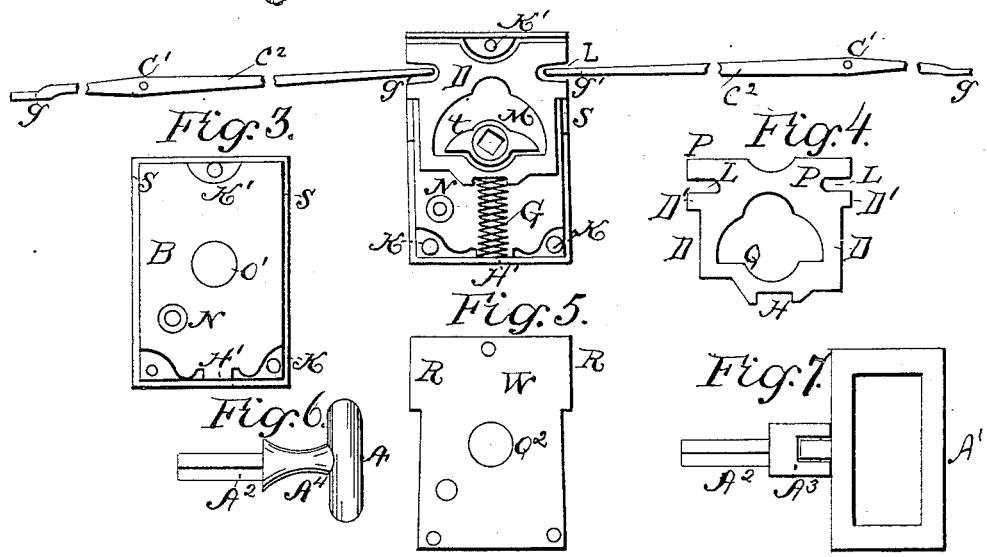
Witnesses:
C. Fred Heller.
J. M. Weaver.
Inventor.
Leander Lehman.
By Theophilus Weaver.
His Atty.

UNITED STATES PATENT OFFICE.

LEANDER LEHMAN, OF HARRISBURG, PENNSYLVANIA.

WAGON END-GATE.

SPECIFICATION forming part of Letters Patent No. 318,635, dated May 26, 1885.

Application filed April 10, 1885. (No model.)

*To all whom it may concern:*

Be it known that I, LEANDER LEHMAN, a citizen of the United States, residing at Harrisburg, in the county of Dauphin and State of Pennsylvania, have invented certain new and useful Improvements in Wagon-End-Gate Openers; and I do hereby declare that the following is a full, clear, and exact description of the invention, which will enable others skilled in the art to which it appertains to make and use the same.

The object of my invention is to provide a simple and efficient mechanism for application to folding end-gate of wagon for operating the two spring-catches holding it closed, as usual, whereby both said catches may be raised and end-gate let down instantly by one hand.

My invention consists, essentially, of two pivoted levers and means for tripping the same, as hereinafter more fully described and claimed, and illustrated in the accompanying drawings, in which—

Figure 1 represents a perspective view of rear end of wagon-bed with my invention applied to end-gate thereof. Fig. 2 represents a plan of trip mechanism with handle and lid of case removed. Figs. 3, 4, 5, 6, and 7 represent, respectively, the bed of casing, the trip-cam, the lid of casing, handle with solid shank, and modified handle with hinged shank.

In the further description reference is had to said views, in which like letters denote like parts.

A denotes the operating-handle with solid shank $A^4$.

A' denotes a laydown handle, attached by hinge-joint to shank $A^3$.

$A^2$ denotes the spline of handle, which is applied in the square eye of tumbler.

M is the means for its rotation, as in door-locks, its tappets $t$ working against parts of the trip-cam D L in recess Q therein. Said trip-cam D L is a block provided with cuts or notches L in its opposite sides, and shoulders D' and P adjacent thereto of greater lateral extent than the lower portions, D, of its sides, which latter are guided by the side walls of the casing B, which is adapted to admit said end of block therein loosely, while said upper parts project through said walls and come even with their exterior edges. Receptacles H and H' in said block and casing, respectively, sustain therein the ends of the spiral spring G, which throws said trip-cam upward when the operating-handle is let go, the upper end of casing serving to stop the ascent of the same. Into said notches L are inserted loosely the ends of the levers $C^2$, which latter are pivoted at C' to end-gate X, while the casing is attached about midway between said pivotal points to the cross-bars on end-gate or block thereon in manner to align said levers to bring their slightly-bent outer ends, $g$, to apply directly against the under sides of the catches $o$, as shown. Staples $a$, with elongated eye vertically, to allow the levers $C^2$ to work up and down in them, serve to keep the same applied to the end-gate's top rail, $x'$.

With the parts united and in position, as shown and described, about a quarter-turn of the operating-handle brings the trip-cam D L down and the inner ends of levers $C^2$ along with it, which raises the outer ends, $g$, of said levers and lifts the spring-catches $o$, to free them of the top of end-gate X, which may then be swung out and let down by the same hand on said handle, thus permitting the operator's other hand to be used for holding articles to be stowed on wagon. Another advantage of my device is, that said catches are not liable to be unduly sprung, as the trip mechanism limits the throw of said levers. I prefer to make the handle, as shown in Fig. 7, to lay down or drop, to be out of the way when wagon is backed against a wall.

I claim—

1. For operating the catches holding closed the end-gate of a wagon, the trip mechanism, substantially as set forth, consisting of a lock-form casing, a trip-cam or sliding block guided vertically in the same, a spiral spring under the latter in said casing, a rotary tumbler for tripping said cam, provided with suitable handle, and two pivoted levers having their inner ends inserted in bearings in said cam, and having their outer ends in communication with said catches for tripping the same, substantially as set forth.

2. In combination with an end-gate, X, of wagon-bed, provided with closing-catches $o$ for the same, the levers $C^2$, secured to endgate by pivots C and staples $a$, the casing B, containing trip-cam D L, in communication with the inner ends of said levers, the tumbler M for said cam, and a suitable rigid or laydown handle for rotating said tumbler, and thereby actuating said cam, levers, and catches, substantially as and for the purposes set forth.

LEANDER LEHMAN.

Witnesses:
 THEOPHILUS WEAVER,
 D. C. MAURER.